United States Patent
Muramatsu

[19]

[11] Patent Number: 6,116,929
[45] Date of Patent: Sep. 12, 2000

[54] CARD CONNECTOR WITH PIVOTABLE PUSH BUTTON ATTACHED TO PUSH ROD OF EJECTOR MECHANISM

[75] Inventor: Hidenori Muramatsu, Kanagawa, Japan

[73] Assignee: The Whitaker Corporation, Wilmington

[21] Appl. No.: 09/213,709

[22] Filed: Dec. 17, 1998

[30] Foreign Application Priority Data

Dec. 26, 1997 [JP] Japan ...................................... 9-367921

[51] Int. Cl.[7] .................................................. H01R 13/62
[52] U.S. Cl. ............................................ 439/159; 439/160
[58] Field of Search ..................................... 439/152, 159, 439/160

[56] References Cited

U.S. PATENT DOCUMENTS

| | | | |
|---|---|---|---|
| 5,443,395 | 8/1995 | Wang ........................................ | 439/159 |
| 5,653,603 | 8/1997 | Sasao et al. ............................. | 439/159 |
| 5,730,610 | 3/1998 | Hsia et al. ............................... | 439/160 |
| 5,997,325 | 12/1999 | Hara ......................................... | 439/159 |
| 6,000,958 | 12/1999 | Ishida et al. ............................ | 439/159 |
| 6,042,402 | 3/2000 | Tung et al. .............................. | 439/159 |

FOREIGN PATENT DOCUMENTS

WO 97/35364  9/1997  WIPO .

OTHER PUBLICATIONS

Japanese Patent Application No. 9–147977 and English Abstract Thereof.
Japanese Patent Application No. 2553110 and Certified Translation Thereof.

*Primary Examiner*—Brian Sircus
*Assistant Examiner*—Michael C. Zarroli

[57] ABSTRACT

The present invention provides an eject button for use on a card connector which prevents accidental ejection of a card, and which makes it possible to minimize the work required for card accommodation in a card-receiving section of the card connector. Eject button (5) is positioned at one end of a sliding bar (20), and it has a first member (50) fastened to the sliding bar (20), and a second member (70) capable of pivoting with respect to the first member (50) between an up position and a down position. A coil torsion spring (30) is placed inside the first member (50) and second member (70). The torsion spring (30) drives the second member (70) in a direction which causes the second member to assume the down position.

11 Claims, 3 Drawing Sheets

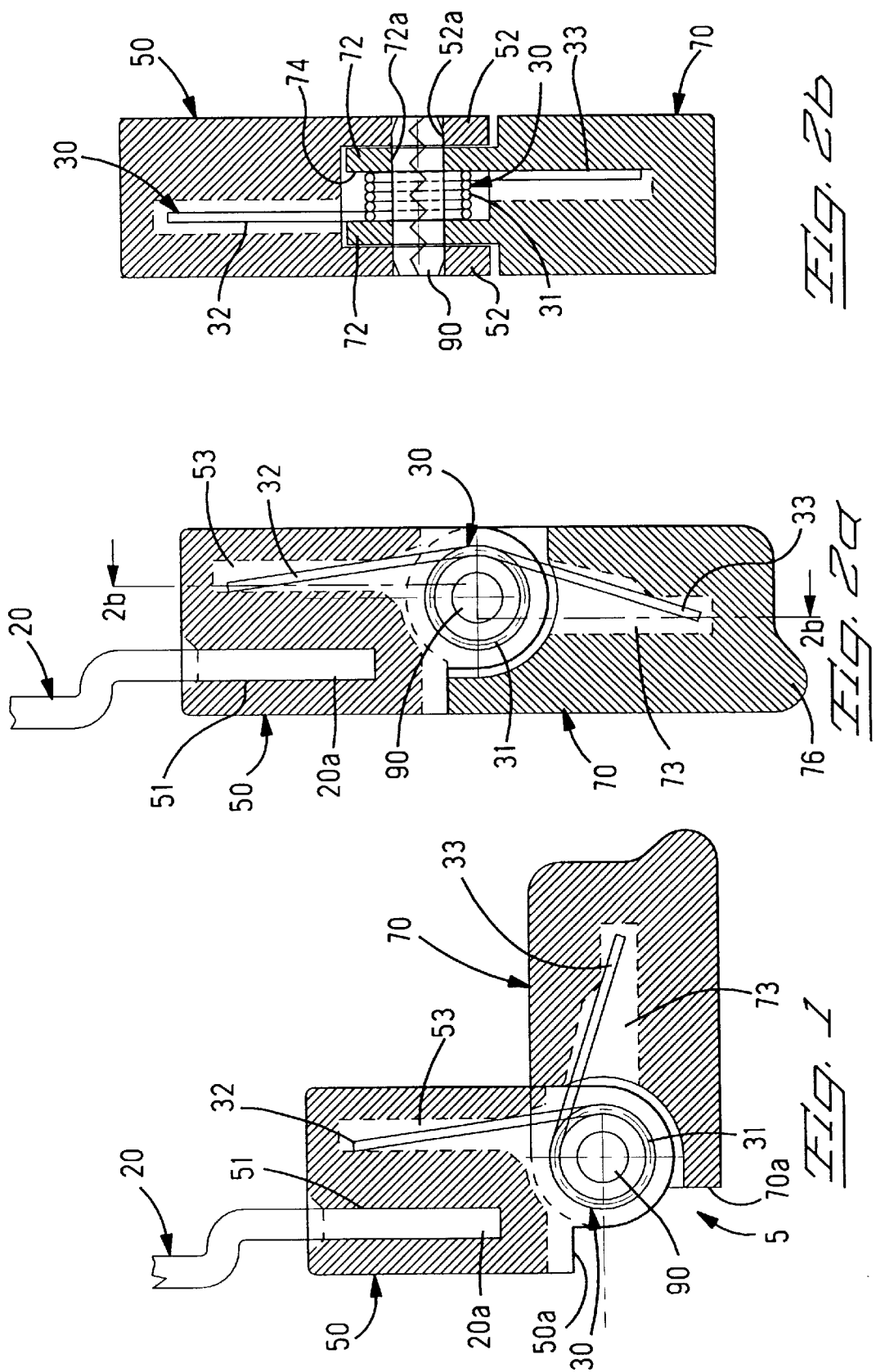

CARD CONNECTOR WITH PIVOTABLE PUSH BUTTON ATTACHED TO PUSH ROD OF EJECTOR MECHANISM

FIELD OF THE INVENTION

The present invention relates to an eject button which is attached to an end of a sliding bar that is operated when a card accommodated in a card connector is ejected, and which is used for the manual operation of the sliding bar. In particular, the present invention relates to an eject button which is constructed so that it can pivot between an up position and a down position.

BACKGROUND OF THE INVENTION

Among card connectors, especially PCMCIA standard connectors that have been widely used in notebook type personal computers in recent years, most card connectors in practical use are equipped with an ejection mechanism that ejects cards accommodated within the card connectors. Most ejection mechanisms have a sliding bar that is accommodated on a side surface of the card connector in a manner that allows sliding there along. The card can be ejected by pushing the sliding bar inwardly from a card-accommodating end of the card connector. An operating button is attached to the end of the sliding bar in order to allow manual operation at the card-accommodating end. The operating button has been improved so that it does not protrude from the card connector or the housing of the card connector; this is done mainly in order to prevent inadvertent electrical disconnection of the card when the card is accommodated within the card connector.

One example of an operating button of a card connector is disclosed in Japanese Patent Application No. 9-147977. The operating button has a first member which is fastened to a sliding bar, and a second member which can pivot approximately 90 degrees between an up position and a down position further toward the end than the first member. When the card connector accommodates a card, protrusion of the second member can be prevented by the person pivoting the second member from the up position to the down position. However, a person will forget to pivot the second member of the button when a card is accommodated, thus causing inadvertent ejection of the card from the card connector.

Accordingly, an object of the present invention is to provide an eject button for use in a card connector which is free of the problems described above, and which makes it possible to minimize the work required for card accommodation.

SUMMARY OF THE INVENTION

The present invention is directed to an eject button attached to an end of a sliding bar used for card ejection and installed in a manner which allows sliding on a side of a card connector, so that the eject button can pivot between an up position and a down position, and which is used to operate the sliding bar.

The eject button is constructed so that it is spring-biased in a direction which causes the button to assume the down position.

The eject button has a first member fastened to the sliding bar, and a second member attached to the first member so that the second member can pivot relative to the first member.

The second member is spring-biased by means of a metal spring member in the direction that causes the second member to assume the down position with respect to the first member.

The spring member is a coil-type torsion spring; however, a metal plate spring may also be used.

The spring is accommodated inside the eject button, i.e., inside the first member and the second member, so that no interference with the spring from the outside can occur.

The coil portion of the coil-type torsion spring is disposed around an axis of relative pivoting of the first member and second member. The pivoting axis can be delineated by a pin that supports the first member and second member so that the members can pivot relative to each other.

BRIEF DESCRIPTION OF THE DRAWINGS

An embodiment of the present invention will now be described by way of example with reference to the accompanying drawings in which:

FIG. 1 shows a cross-sectional view of an eject button for a card connector in a down position into which the button is normally driven by a card.

FIGS. 2a and 2b are cross-sectional views showing the eject button in an up position in order to eject a card from the card connector with FIG. 2a being a view similar to FIG. 1, while FIG. 2b is a cross-sectional view taken along line 2b—2b in FIG. 2a, with the torsion spring being shown superimposed.

DETAILED DESCRIPTION OF THE INVENTION

Figure 3:
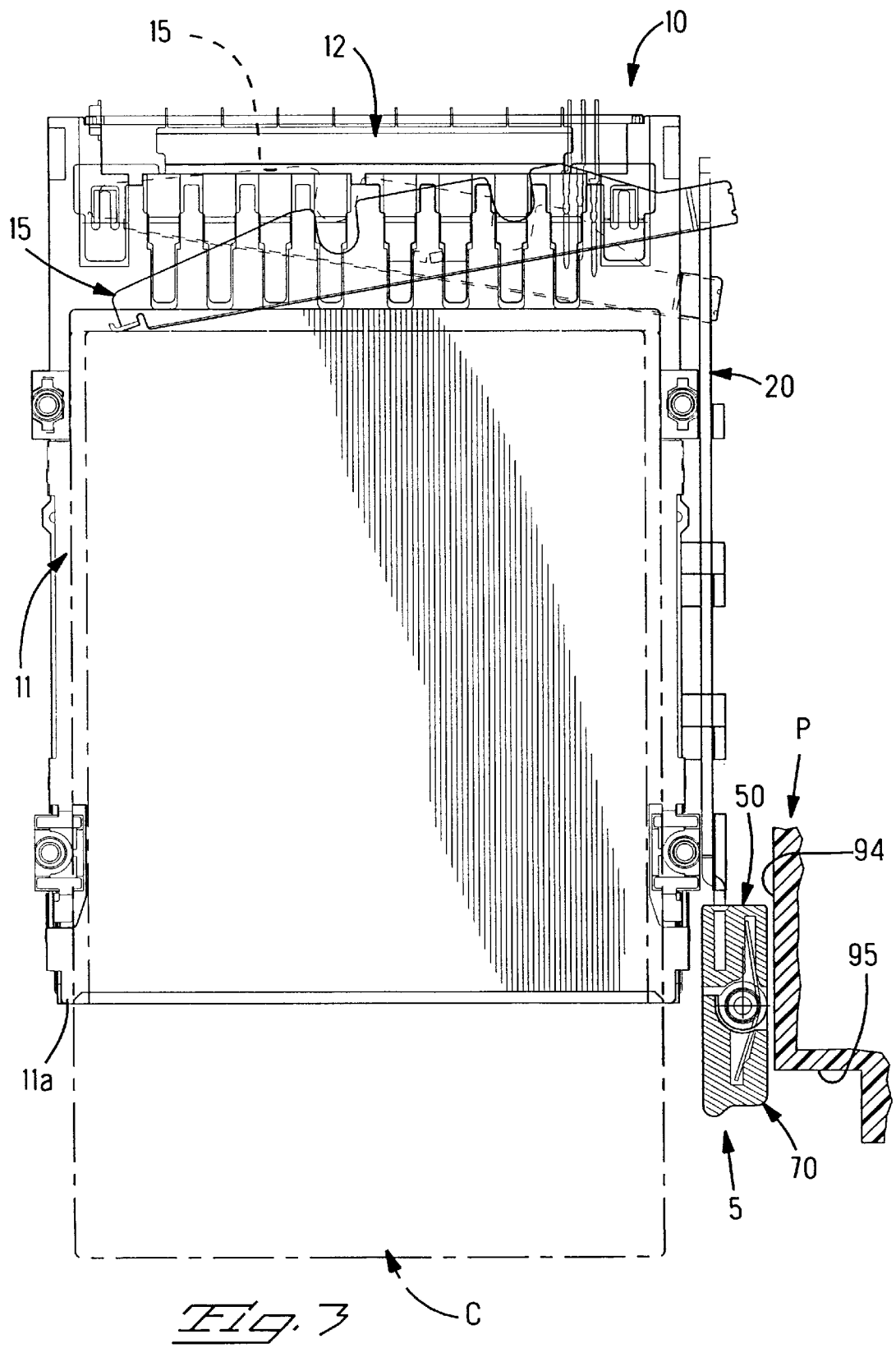
FIG. 3 is a schematic plan view illustrating the overall card connector and showing a state in which the second member is in the up position prior to card accommodation or following the completion of card ejection.

As shown in FIGS. 1, 2a and 2b, eject button 5 has a first member 50, which is directly fastened to an end of sliding bar 20 used on a card connector, and a second member 70, which is disposed so that it is free to pivot relative to the first member 50. The first member 50 and second member 70 are formed by molding from a suitable plastic, and the sliding bar 20 is formed from a metal plate. End portion 20a of the sliding bar 20 is engaged with and secured in a bar-engaging cavity 51 in the first member 50.

The first member 50 and second member 70 are constructed so that they can pivot relative to each other. As seen especially clearly with reference to FIG. 2b, plate sections 52 and 72, which are pairs, are respectively located on the first member 50 and second member 70; the plate sections are overlapped so that the plate sections 72 are positioned inside the plate sections 52. A pin 90 passes through holes 52a and 72a in the plate sections thereby connecting the plate sections so that they can pivot relative to each other. For example, pin 90 may be a spring pin which has spring properties that open the pin outward.

The second member 70 includes a protruding section 76 in which the external shape protrudes outward in a position offset to one side at one end of the second member 70.

As shown in FIGS. 1, 2a and 2b, a coil-form torsion spring 30 is accommodated inside the first member 50 and second member 70. The torsion spring 30 has a central coil section 31, and a pair of extensions 32, 33 that extend from the coil section 31. The coil section 31 is accommodated inside a coil-accommodating chamber 74 which is delineated by inside walls of the plate sections 72 of the second member 70; furthermore, the extensions 32, 33 are accommodated in cavities 53 and 73 that are respectively located in the first member 50 and second member 70. It should be noted that the coil section 31 of torsion spring 30 has a larger diameter than the pin 90, and that the coil section is positioned around the pin 90 along the circumference thereof.

The extensions 32, 33 of the torsion spring 30 engage with respective inside surfaces of the cavities 53, 73, and thus provide a spring force in a pivoting direction which causes the second member 70 to adopt a down position with respect to the first member 50. Accordingly, if no external force is applied, the first member 50 and second member 70 will be placed in the down position shown in FIG. 1. The advantages of this will be described with reference to FIGS. 3 and 4.

Figure 4:
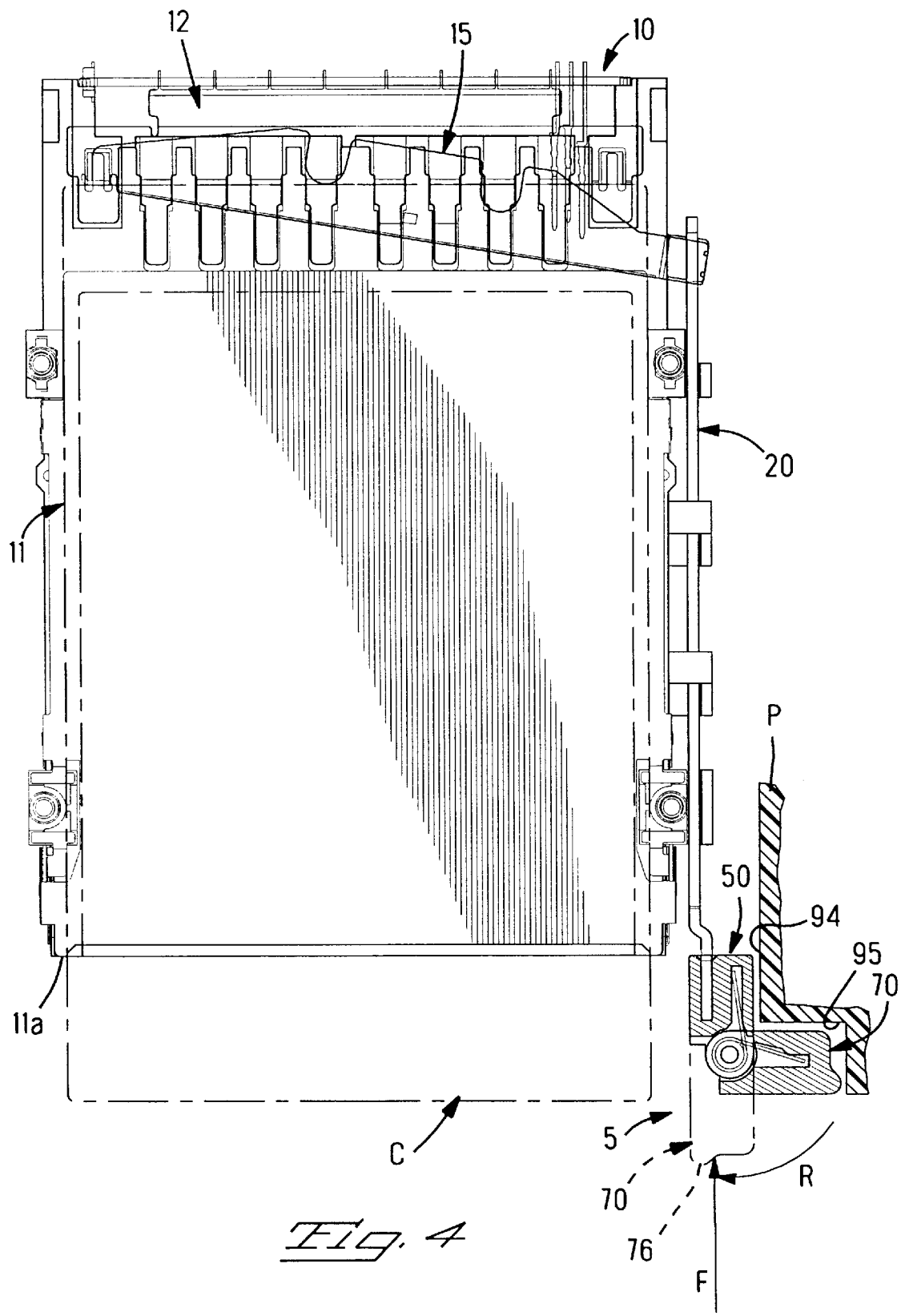
FIG. 4 is a schematic plan view similar to FIG. 3 illustrating the overall card connector and showing a state in which the second member is in the down position during card accommodation.

FIGS. 3 and 4 show schematic plan views which illustrate the overall card connector. FIG. 3 shows a state in which the second member is in an up position prior to card accommodation within the card connector or following the completion of card ejection, while FIG. 4 shows a state in which the second member is in a down position during card accommodation. Thus, the second member 70 is aligned with first member 50 in FIG. 3; whereas, in FIG. 4, second member 70 is normally biased at an angle with respect to first member 50 under the bias of spring 30.

As shown in FIGS. 3 and 4, in addition to being equipped with a card accommodating frame 11 and an electrical connector 12, the card connector 10 is also equipped with a card ejection mechanism which has sliding bar 20, an ejection arm 15 which moves in conjunction with sliding bar 20, and the eject button 5, which is engaged with and fastened to the sliding bar 20. As will be seen from the transition from the state shown in FIG. 4 to the state shown in FIG. 3, a card C accommodated in the card-accommodating frame 11 of the card connector 10 can be ejected by pushing the sliding bar 20 to the rear of the card connector, thus driving the ejection arm 15 so that a portion of the card C is pushed out from card-accommodating end 11a.

An important point in the present invention is the action of the eject button 5 during the transition from the state shown in FIG. 3 to the state shown in FIG. 4. Prior to the insertion of a card C into the card connector 10, the sliding bar 20 is in a state in which this bar has been caused to slide relatively far toward the rear as shown in FIG. 3. In this case, a pivot-restricting member 94, which includes a relatively smooth surface of the housing P in which the card connector 10 is accommodated, is disposed in close proximity to the eject button 5. The second member 70 of the eject button 5, which is ordinarily driven into the down position, is prevented from assuming the down position by engagement with the pivot-restricting member 94; accordingly, the second member 70 assumes the up position as shown in FIG. 3. Stop surfaces of first member 50 and second member 70 engage one another when the members are in alignment as eject button 5 moves along pivot-restricting member 94.

As insertion of the card C progresses within card-accommodating frame 11, an inner end of the card C engages the ejection arm 15 causing it to pivot; as a result, the sliding bar 20 slides toward the front end, i. e., the card accommodating end 11a. Accordingly, the eject button 5 moves toward the front end. A recess 95 with dimensions that allow for the accommodation of the second member 70 of the eject button 5 is located in the pivot-restricting member 94 of the housing body P. When the eject button 5 is moved so that it reaches a position where the second member 70 overlaps with the recess 95, the spring-biased second member 70 automatically enters the recess 95 as shown in FIG. 4. Specifically, in the process in which the person inserts the card, the person can place the second member 70 inside the recess 95 without touching the eject button. Accordingly, there is no danger that the person will forget to push the second member 70 down, and later accidentally release the electrical connections between the card and connector 12 during use, as in conventional products. In addition, the person inserting the card can estimate the degree of card insertion from the degree of pivoting of the second member 70 of the eject button 5; accordingly, by appropriately setting the dimensions and shape of the recess 95, the person can also confirm that insertion of the card C has been completed.

When the inserted card C is to be ejected, the person first causes the second member 70 of the eject button 5 to pivot in the direction indicated by arrow R, so that the second member 70 is caused to assume the up position as shown by the broken line in FIG. 4. Afterward, the second member 70 is pushed inward toward the rear of the card connector in the direction indicated by arrow F. As a result, the sliding bar 20 is pushed rearward, thus causing the ejection arm 15 to pivot so that the card C is ejected. In this case, it is necessary that the person maintain the second member 70 in the up position against the spring force of the torsion spring 30. The protruding section 76 on the second member 70 facilitates the handling and operation of the second member 70 by the fingers of the person. Specifically, since the protruding section 76 is located in an offset position along the side wall on the opposite side from the direction in which the protruding section 76 is spring-biased, the person can catch fingers on the protruding section 76 so that the second member 70 is not pushed over when the person pushes the eject button 5 inwardly. Accordingly, the person can perform the card-ejection operation very easily. As card ejection takes place, the eject button 5 is moved rearward, and the up position is maintained by engagement with the pivot-restricting member 94 of the housing P as was described above.

A preferred embodiment of the present invention has been described in detail above. However, this description is merely for purposes of illustration; various modifications and alterations might be made by a person skilled in the art. For example, some other spring member such as a plate spring, may be used instead of a coil-form torsion spring. Furthermore, the pivot-restricting member 94 of the housing P and the recess 95 may be delineated by parts integrally built into the card connector 10.

The eject button of the present invention is constructed so that the eject button is spring-biased in a direction which causes the eject button to assume a down position. Accordingly, when the eject button is returned to the front, the eject button automatically assumes the down position; consequently, there is no danger that the person will forget to push over the eject button and accidentally release the electrical connection between the electrical connector and the card during subsequent use as in conventional products. Furthermore, the person inserting the card can estimate the degree of card insertion from the degree of pivoting of the second member of the eject button; accordingly, by providing a member with an appropriate shape and dimensions which regulates the pivoting of the button, the person can also confirm that the insertion of the card C within the card connector has been completed.

What is claimed is:

1. An ejection mechanism for a card connector comprising:
   a frame having a card-accommodating section in which a card is to be received including an electrical connector to which the card is to be electrically connected;
   a sliding bar slidably mounted on the frame and having one end connected to an ejection arm;
   a button mounted onto another end of the sliding bar including a first member and a second member;
   pivot members pivotally mounting the first member and second member together;
   a spring member mounted on the first member and second member normally biasing the second member to a first position at an angle with respect to the first member when the card is completely inserted into the card-accommodating section; and
   wherein the second member is pivotable to a second position in which the second member is aligned with respect to the first member and the spring member is more heavily loaded than when the second member is in the first position.

2. An ejection mechanism as claimed in claim 1, wherein the second member is moved into the second position whereafter the button is pushed thereby moving the sliding bar and ejection arm which causes the ejection arm to eject a portion of the card from the card-accommodating section.

3. An ejection mechanism as claimed in claim 2, wherein a pivot-restricting member is engaged by the aligned first member and the second member to maintain them in alignment when the button is pushed therealong.

4. An ejection mechanism as claimed in claim 3, wherein said pivot-restricting member includes a recess in which the second member is biased when the card is inserted into the card-accommodating section.

5. An ejection mechanism as claimed in claim 1, wherein said pivot members include overlapping plate sections and a pivot pin extending therethrough.

6. An ejection mechanism as claimed in claim 5, wherein the spring member includes a coil section mounted around the pivot pin and extensions disposed respectively in cavities in the first member and the second member.

7. An ejection mechanism as claimed in claim 3, wherein the first member and second member have stop surfaces engaging one another when the button moves along the pivot-restricting member.

8. An eject button for use on a sliding bar of an ejection mechanism of a card connector comprising:
   first member mounted onto the sliding bar;
   a second member pivotally mounted onto the first member;
   a spring member mounted on the first member and the second member normally biasing the second member to a first position at an angle with respect to the first member when a card is inserted into a card-accommodating section of the card connector; and
   wherein the second member is pivotable to a second position in which the second member is aligned with respect to the first member and the spring member is more heavily loaded than when the second member is in the first position.

9. An eject button as claimed in claim 8, wherein the first member and the second member include overlapping plate sections and a pivot pin extending therethrough.

10. An eject button as claimed in claim 9, wherein the spring member includes a coil section mounted around the pivot pin and extensions disposed respectively in cavities in the first member and the second member.

11. An ejection mechanism for a card connector comprising:
   a frame having a card-accommodating section which receives a card, and an electrical connector for electrical connection to the card;
   a sliding bar slidably mounted on the frame and having one end connected to an ejection arm;
   a button mounted onto another end of the sliding bar including a first member and a second member;
   the first member and the second member having overlapping plate sections and a pivot pin extending therethrough; and
   a spring member having a coil section mounted around the pivot pin and extensions disposed respectively in cavities in the first member and the second member, the spring member normally biasing the second member at an angle with respect to the first member when the card is inserted into the card-accommodating section.

* * * * *